(12) United States Patent
Johoji et al.

(10) Patent No.: US 6,300,447 B1
(45) Date of Patent: Oct. 9, 2001

(54) ETHYLENE-α-OLEFIN-NONCONJUGATED POLYENE RANDOM COPOLYMER

(75) Inventors: Hirofumi Johoji; Toshiyuki Kuwabara; Atsuko Ogawa, all of Chiba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/315,233

(22) Filed: May 20, 1999

(30) Foreign Application Priority Data

May 20, 1998 (JP) .................................................. 10-138415

(51) Int. Cl.$^7$ .................................................. C08F 210/18
(52) U.S. Cl. ........................ 526/281; 526/348.6; 526/160; 526/161; 526/916; 526/131; 526/336; 526/283; 502/152; 502/155
(58) Field of Search ............................... 526/348.6, 161, 526/916, 348, 133, 160, 336, 281, 283, 131; 502/152, 155

(56) References Cited

U.S. PATENT DOCUMENTS

| | | | | |
|---|---|---|---|---|
| 6,084,046 | * | 7/2000 | Johoji et al. | 526/339 |
| 6,084,048 | * | 7/2000 | Hozumi et al. | 526/348.6 |
| 6,121,401 | * | 9/2000 | Yamamoto et al. | 526/348.6 |
| 6,184,319 | * | 2/2001 | Sato et al. | 526/161 |
| 6,187,889 | * | 2/2001 | Oi et al. | 526/347 |

FOREIGN PATENT DOCUMENTS

| | | |
|---|---|---|
| 0 718 324 A2 | 6/1996 | (EP) . |
| 0 751 156 A2 | 1/1997 | (EP) . |
| 0 842 939 A1 | * 5/1998 | (EP) . |
| 8-301934 | 11/1996 | (JP) . |
| 9-12635 | 1/1997 | (JP) . |
| 9-71616 | 3/1997 | (JP) . |
| 9-87313 | 3/1997 | (JP) . |
| 9-169878 | 6/1997 | (JP) . |

OTHER PUBLICATIONS

JP 09176402 A (Mitsui Petrochemical Ind. Co Ltd.) Jul. 7, 1997, World Patents Index [online]. London, U.K.: Derwent Publications, Ltd. Retrieved from: Questel/Orbit, Paris, France, DW 199737, Accession No. 1997–399687.

JP 09003277 A (Mitsui Petrochemical Ind. Co. Ltd.) Kam/ 1. 1999. World Patents Index [online]. London, U.K.: Derwent Publications, Ltd. Retrieved from: Questel/Orbit, Paris, France, DW 199732, Accession No. 1997–115427.

JP 08253635 A (Mitsui Petrochemical Ind. Co. Ltd.) Oct. 10, 1996. World Patents Index [online]. London, U.K.: Derwent Publications, Ltd. Retrieved from: Questel/Orbit, Paris, France, DW 199649, Accession No. 1996–493523.

* cited by examiner

Primary Examiner—David W. Wu
Assistant Examiner—R. Harlan
(74) Attorney, Agent, or Firm—Fitch, Even, Tabin & Flannery

(57) ABSTRACT

An ethylene-α-olefin-nonconjugated polyene random copolymer obtained by polymerizing the following components (a), (b) and (c) in the presence of a catalyst comprising a transition metal complex having at least one cyclopentadienyl skeleton and satisfying the conditions (1), (2), (3) and (4):

(a) ethylene,
(b) α-olefin having 3 to 20 carbon atoms, and
(c) one or more nonconjugated polyene at least containing a nonconjugated polyene in which at least one or more hydrogen atoms are respectively bound to all of carbon atoms having a double bond;
  (1) the molar ratio of a unit derived from ethylene to a unit derived from α-olefin in the copolymer is 95/5 to 20/80,
  (2) the iodine value is 0 to 50 (g/100 g polymer),
  (3) the intrinsic viscosity [η] measured in xylene at 70° C. is 0.5 to 10 dl/g, and
  (4) the Q value (weight average molecular weight/ number average molecular weight) measured by gel permeation chromatography (GPC) is 3.0 or more.

12 Claims, No Drawings

ETHYLENE-α-OLEFIN-NONCONJUGATED POLYENE RANDOM COPOLYMER

BACKGROUND OF THE INVENTION

1. Field of the Invention

The present invention relates to an ethylene-α-olefin-nonconjugated polyene random copolymer, a composition comprising said copolymer and a process for producing said copolymer. More precisely, the present invention relates to an ethylene-α-olefin-nonconjugated polyene random copolymer having a wide molecular weight distribution and superior in processability, a composition comprising said copolymer and a process for producing said copolymer.

2. Description of Related Art

Because of their good performances such as good heat resistance, good weathering resistance, good ozone resistance and the like, ethylene-α-olefin-nonconjugated polyene random copolymers have used in wide application as automobile materials, building materials, industrial materials, cable materials and the like. The copolymers have conventionally been produced using vanadium catalysts.

The copolymers obtained by using these catalysts, however, had a narrow molecular weight distribution and are inferior in processability. As a means for improving these defects, for example, a process has been proposed in which a multi-step polymerization vessel is used to form a polymer having varied molecular weight and a different composition. Actually, however, a polymer having a desired molecular weight distribution and composition could not be easily obtained. In addition, the process had a problem that the productivity of the reaction vessel was very low due to the necessity of limiting the ratio of polymers produced in respective polymerization step-vessels.

Recently, on the other hand, numerous processes for producing ethylene-α-olefin-nonconjugated polyene random copolymers have been proposed using highly reactive metallocene catalysts. These processes, however, had also a defect that the polymer produced by these processes had a very narrow molecular weight distribution like the polymers obtained with the conventional vanadium catalysts and thus their processability was greatly problematic.

Under these circumstances, the purpose of the invention is to provide an ethylene-α-olefin-nonconjugated polyene random copolymer having a wide molecular weight distribution and superior inprocessability, a composition comprising said copolymer and a process for producing said copolymer.

SUMMARY OF THE INVENTION

The present invention relates to an ethylene-α-olefin-nonconjugated polyene random copolymer obtained by polymerizing the following components (a), (b) and (c) in the presence of a catalyst comprising a transition metal complex having at least one cyclopentadienyl skeleton and satisfying the conditions (1), (2), (3) and (4):

(a) ethylene,
(b) α-olefin having 3 to 20 carbon atoms, and
(c) one or more nonconjugated polyene containing a nonconjugated polyene in which at least one or more hydrogen atoms are respectively bound to all of carbon atoms having a double bond;
  (1) the molar ratio of a unit derived from ethylene to a unit derived from α-olefin in the copolymer being 95/5 to 20/80,
  (2) the iodine value is 0 to 50 (g/100 g polymer,)
  (3) the intrinsic viscosity [η] measured in xylene at 70° C. is 0.5 to 10 dl/g, and
  (4) the Q value (weight average molecular weight/number average molecular weight) measured by gel permeation chromatography (GPC) is 3.0 or more.

The present invention also relates to a copolymer composition comprising said copolymer of the invention and all or part of a softening agent, a reinforcing agent and a vulcanizing agent.

DETAILED DESCRIPTION OF THE INVENTION

In the present invention, (a) is ethylene.

In the present invention, (b) is α-olefin having 3 to 20 carbon atoms.

As the α-olefin, a mixture of two or more monomers can be used simultaneously. Specific examples of the α-olefin include linear olefins such as propylene, 1-butene, 1-pentene, 1-hexene, 1-heptene, 1-octene, 1-nonene, 1-decene and the like, branched olefins such as 3-methyl-1-butene, 3-methyl-1-pentene, 4-methyl-1-pentene and the like, vinylcyclohexane and so on. Preferred compounds are propylene and 1-butene. Particularly preferred one is propylene.

In the present invention, (c) is a nonconjugated polyene in which at least one or more hydrogen atoms are respectively bound to all of carbon atoms having a double bond.

As a nonconjugated polyene (c) in which at least one or more hydrogen atoms are respectively bound to all of carbon atoms having a double bond can be used linear or cyclic nonconjugated dienes and nonconjugated polyene monomers. Specific examples include 1,4-hexadiene, 1,5-hexadiene, 1,5-heptadiene, 1,6-heptadiene, 1,6-octadiene, 1,7-octadiene, 1,7-nonadiene, 1,8-nonadiene, 1,8-decadiene, 1,9-decadiene, 1,12-tetradecadiene, 1,13-tetradecadiene, 3-methyl-1,4-hexadiene, 3-methyl-1,5-hexadiene, 3-ethyl-1,4-hexadiene, 3-ethyl-1,5-hexadiene, 3,3-dimethyl-1,4-hexadiene, 3,3-dimethyl-1,5-hexadiene, 5-vinyl-2-norbornene, 2,5-norbornadiene, 7-methyl-2,5-norbornadiene, 7-ethyl-2,5-norbornadiene, 7-propyl-2,5-norbornadiene, 7-butyl-2,5-norbornadiene, 7-pentyl-2,5-norbornadiene, 7-hexyl-2,5-norbornadiene, 7,7-dimethyl-2,5-norbornadiene, 7-methyl-7-ethyl-2,5-norbornadiene, 7-chloro-2,5-norbornadiene, 7-bromo-2,5-norbornadiene, 7-fluoro-2,5-norbornadiene, 7,7-dichloro-2,5-norbornadiene, 1-methyl-2,5-norbornadiene, 1-ethyl-2,5-norbornadiene, 1-propyl-2,5-norbornadiene, 1-butyl-2,5-norbornadiene, 1-chloro-2,5-norbornadiene, 1-bromo-2,5-norbornadiene, 5-vinyl-2-norbornene, 5-isopropenyl-2-norbornene and the like. In addition, examples include cyclic dienes having structural formulae shown below:

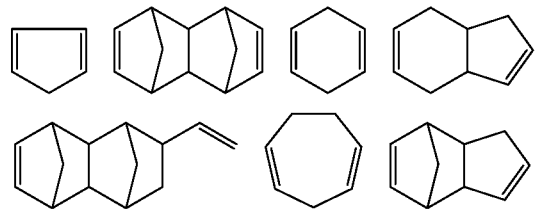

-continued

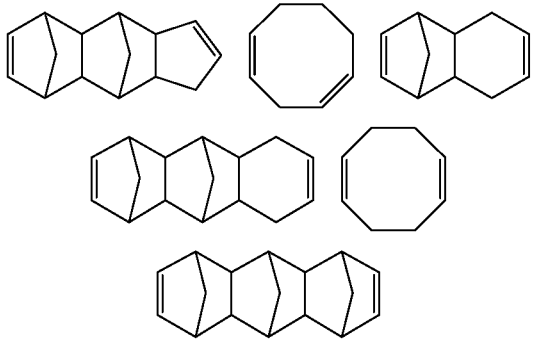

In the present invention, these polyenes can be used independently or in combination thereof. Particularly, norbornadiene derivatives, which are particularly cyclic polyenes having strained cyclic structure such as norbornadiene, dicyclopentadiene or vinyl norbornene are preferred. When these compounds are used, the molecular weight distribution can be widened by the addition of a relatively small amount.

More preferred one is dicyclopentadiene, which is advantageous in that the molecular weight distribution can be widened by the smallest amount.

As (c) in the present invention, other polyenes may be co-used in order to control physical properties. In these other polyene, it is not necessary that at least one or more hydrogen atoms be respectively bound to all of carbon atoms having a double bond. Specific examples of these polyenes include 5-ethylidene-2-norbornene, 5-propylidene-2-norbornene, 5-methylene-2-norbornene, 5-isopropylidene-2-norbornene, 5-methylene-2-norbornene, 5-ethylidene-2-norbornene, and polyene compounds illustrated in JP 10-7735 A, JP 9-40586 A, JP 9-188724 A and the like. Preferably, 5-ethylidene-2-norbornene is used.

The copolymer of the invention is a copolymer obtained by polymerizing the components (a), (b) and (c) described above in the presence of a catalyst comprising a transition metal complex having at least one cyclopentadienyl skeleton.

As the transition metal complex above, any complex illstrated in JP 9-169878 A, JP 9-87313 A, JP 9-12635 A, and JP 8-301934 A are available, but transition metal complexes (A) represented by the following chemical formula [I]-[III] are preferred.

The copolymer of the present invention is suitably obtained by using a catalyst comprising the following (A), (B) and/or (C).

(A): at least one transition metal complex represented by the following formula [I], [II] or [III]:

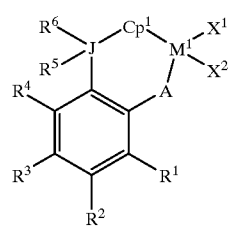

[I]

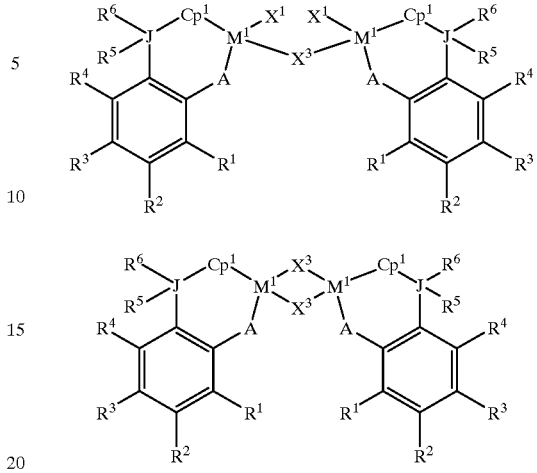

[II]

[III]

wherein $M^1$ represents a transition metal atom of group IV in the Periodic Table of the Elements; A represents an atom of group XVI in the Periodic Table of the Elements; J represents an atom of group XIV in the Periodic Table of the Elements; $Cp^1$ represents a group having a cyclopentadiene type anion skeleton; $X^1$, $X^2$, $R^1$, $R^2$, $R^3$, $R^4$, $R^5$ and $R^6$ independently represent a hydrogen atom, a halogen atom, an alkyl group, an aralkyl group, an aryl group, a substituted silyl group, an alkoxy group, an aralkyloxy group, an aryloxy group, or a disubstiuted amino group; and $R^1$, $R^2$, $R^3$, $R^4$, $R^5$ and $R^6$ may be combined optionally to form a ring.

$X^3$ represents an atom of group XVI in the Periodic Table of Elements; Two of $M^1$, A, J, $Cp^1$, $X^2$, $X^3$, $R^1$, $R^2$, $R^3$, $R^4$, $R^5$ and $R^6$ may be the same or different:

(B): one or more of aluminum compounds selected from the following (B1)–(B3):
(B1) An organoaluminum compound represented by the general formula $E^1_a AlZ_{3-a}$.
(B2) cyclic aluminoxane represented by the general formula $\{-Al(E^2)-O-\}_b$ and
(B3) linear aluminoxane represented by the general formula $E^3\{-Al(E^3)-O-\}_c AlE^3_2$
(wherein $E^1$, $E^2$ and $E^3$ respectively represent a hydrocarbon group and each of the $E^1$, $E^2$ and $E^3$ groups may be the same or different; Z represents a hydrogen atom or a halogen atom and each of the Z groups may be the same or different; a satisfies the following equation: $0<a\leq 3$; b represents an integer of 2 or more; and c represents an integer of 1 or more.)

(C): any one boron compound of the following (C1)–(C3):
(C1) a boron compound represented by the general formula $BQ^1Q^2Q^3$,
(C2) a boron compound represented by the general formula $G^+(BQ^1Q^2Q^3Q^4)$ and
(C3) a boron compound represented by the general formula $(L-H)^+(BQ^1Q^2Q^3Q^4)$
(wherein B represents a trivalent boron atom in the valence state; $Q^1$ to $Q^4$ may each be the same or different and represent a halogen atom, a hydrocarbon group, a halogenated hydrocarbon group, a substituted silyl group, an alkoxy group or a disubstituted amino group; $G^+$ is an inorganic or organic cation; L is a neutral Lewis base; and $(L-H)^+$ is a Bronsted acid.)

Hereinafter, the present invention will be described in more detail.

(A) Transition metal complex is explained.

In the general formula [I], [II] and [III], the transition metal atom represented by $M^1$ is a transition metal element of group IV in the Periodic Table of the Elements (Revised Version 1989 of IUPAC, Inorganic Chemistry Nomenclature) and examples thereof include a titanium atom, a zirconium atom, a hafnium atom, or the like, preferably a titanium atom or a zirconium atom.

Examples of the atom of the group XVI in the Periodic Table of the element represented by "A" in the general formula [I], [II] or [III] include an oxygen atom, a sulfur atom, a selenium atom, etc., and preferably an oxygen atom.

Examples of the atom of group XIV in the Periodic Table of the element represented by "J" in the general formula [I], [II] or [III] include a carbon atom, a silicon atom, a germanium atom and the like, preferably a carbon atom or a silicon atom.

Examples of the group having a cyclopentadiene type anion skeleton represented by the substituent $Cp^1$ include a $\eta^5$-(substituted)cyclopentadienyl group, $\eta^5$-(substituted) indenyl group, $\eta^5$-(substituted) fluorenyl group, etc. Examples thereof are $\eta^5$-cyclopentadienyl group, $\eta^5$-methylcyclopentadienyl group, $\eta^5$-dimethylcyclopentadienyl group, $\eta^5$-trimethylcyclopentadienyl group, $\eta^5$-tetramethylcyclopentadienyl group, $\eta^5$-ethylcyclopentadienyl group, $\eta^5$-n-propylcyclopentadienyl group, $\eta^5$-isopropylcyclopentadienyl group, $\eta^5$-n-butylcyclopentadienyl group, $\eta^5$-sec-butylcyclopentadienyl group, $\eta^5$-tert-butylcyclopentadienyl group, $\eta^5$-n-pentylcyclopentadienyl group, $\eta^5$-neopentylcyclopentadienyl group, $\eta^5$-n-hexylcyclopentadienyl group, $\eta^5$-n-octylcyclopentadienyl group, $\eta^5$-n-phenylcyclopentadienyl group, $\eta^5$-naphthylcyclopentadienyl group, $\eta^5$-trimethylsilylcyclopentadienyl group, $\eta^5$-triethylsilylcyclopentadienyl group, $\eta^5$-tert-butyldimethylsilylcyclopentadienyl group, $\eta^5$-indenyl group, $\eta^5$-methylindenyl group, $\eta^5$-dimethylindenyl group, $\eta^5$-ethylindenyl group, $\eta^5$-n-propylindenyl group, $\eta^5$-isopropylindenyl group, $\eta^5$-n-butylindenyl group, $\eta^5$-sec-butylindenyl group, $\eta^5$-tert-butylindenyl group, $\eta^5$-n-pentylindenyl group, $\eta^5$-neopentylindenyl group, $\eta^5$-n-hexylindenyl group, $\eta^5$-n-octylindenyl group, $\eta^5$-n-decylindenyl group, $\eta^5$-phenylindenyl group, $\eta^5$-methylphenylindenyl group, $\eta^5$-naphthylindenyl group, $\eta^5$-trimethylsilylindenyl group, $\eta^5$-triethylsilylindenyl group, $\eta^5$-tert-butyldimethylsilylindenyl group, $\eta^5$-tetrahydroindenyl group, $\eta^5$-fluorenyl group, $\eta^5$-methylfluorenyl group, $\eta^5$-dimethylfluorenyl group, $\eta^5$-ethylfluorenyl group, $\eta^5$-diethylfluorenyl group, $\eta^5$-n-propylfluorenyl group, $\eta^5$-di-n-propylfluorenyl group, $\eta^5$-isopropylfluorenyl group, $\eta^5$-diisopropylfluorenyl group, $\eta^5$-n-butylfluorenyl group, $\eta^5$-sec-butylfluorenyl group, $\eta^5$-tert-butylfluorenyl group, $\eta^5$-di-n-butylfluorenyl group, $\eta^5$-di-sec-butylfluorenyl group, $\eta^5$-di-tert-butylfluorenyl group, $\eta^5$-n-pentylfluorenyl group, $\eta^5$-neopentylfluorenyl group, $\eta^5$-n-hexylfluorenyl group, $\eta^5$-n-octylfluorenyl group, $\eta^5$-n-decylfluorenyl group, $\eta^5$-n-dodecylfluorenyl group, $\eta^5$-phenylfluorenyl group, $\eta^5$-di-phenylfluorenyl group, $\eta^5$-methylphenylfluorenyl group, $\eta^5$-naphthylfluorenyl group, $\eta^5$-trimethylsilylfluorenyl group, $\eta^5$-bis-trimethylsilylfluorenyl group, $\eta^5$-triethylsilylfluorenyl group, $\eta^5$-tert-butyldimethylsilylfluorenyl group, etc., preferably a $\eta^5$-cyclopentadienyl group, $\eta^5$-methylcyclopentadienyl group, $\eta^5$-tert-butylcyclopentadienyl group, $\eta^5$-tetramethylcyclopentadienyl group, $\eta^5$-indenyl group and $\eta^5$-fluorenyl group.

Examples of the halogen atom in the substituents $X^1$, $X^2$, $R^1$, $R^2$, $R^3$, $R^4$, $R^5$ and $R^6$ include a fluorine atom, chlorine atom, bromine atom, iodine atom and the like, preferably a chlorine atom or a bromine atom, more preferably a chlorine atom.

As the alkyl group in the substituents $X^1$, $X^2$, $R^1$, $R^2$, $R^3$, $R^4$, $R^5$ and $R^6$, an alkyl group having carbon atoms of 1–20 in is preferable. Examples of such an alkyl group include methyl group, ethyl group, n-propyl group, isopropyl group, n-butyl group, sec-butyl group, tert-butyl group, n-pentyl group, neopentyl group, amyl group, n-hexyl group, n-octyl group, n-decyl group, n-dodecyl group, n-pentadecyl group, n-eicosyl group, etc., preferably a methyl group, ethyl group, isopropyl group, tert-butyl group or amyl group.

These alkyl groups may be substituted with a halogen atom such as a fluorine atom, chlorine atom, bromine atom, iodine atom or the like. Examples of alkyl groups having 1–20 carbon atoms substituted with halogen atom(s) include a fluoromethyl group, difluoromethyl group, trifluoromethyl group, chloromethyl group, dichloromethyl group, trichloromethyl group, bromomethyl group, dibromomethylgroup, tribromomethyl group, iodomethyl group, diiodomethyl group, triiodomethyl group, fluoroethyl group, difluoroethyl group, trifluoroethyl group, tetrafluoroethyl group, pentafluoroethyl group, chloroethyl group, dichloroethyl group, trichloroethyl group, tetrachloroethyl group, pentachloroethyl group, bromoethyl group, dibromoethyl group, tribromoethyl group, tetrabromoethyl group, pentabromoethyl group, perfluoropropyl group, perfluorobutyl group, perfluoropentyl group, perfluorohexyl group, perfluorooctyl group, perfluorododecyl group, perfluoropentadecyl group, perfluoroeicosyl group, perchloropropyl group, perchlorobutyl group, perchloropentyl group, perchlorohexyl group, perchlorooctyl group, perchlorododecyl group, perchloropentadecyl group, perchloroeicosyl group, perbromopropyl group, perbromobutyl group, perbromopentyl group, perbromohexyl group, perbromooctyl group, perbromododecyl group, perbromopentadecyl group, perbromoeicosyl group or the like.

These alkyl groups may be partially substituted by an alkoxy group such as a methoxy group, ethoxy group, an aryloxy group (such as phenoxy group), or aralkyloxy group (such as benzyloxy group), etc.

As the aralkyl group in the substituents $X^1$, $X^2$, $R^1$, $R^2$, $R^3$, $R^4$, $R^5$ and $R^6$, an aralkyl group having 7–20 carbon atoms is preferable. Examples of such aralkyl groups include a benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (4,6-dimethylphenyl)methyl group, (2,3,4-trimethylphenyl)methyl group, (2,3,5-trimethylphenyl)methyl group, (2,3,6-trimethylphenyl)methyl group, (3,4,5-trimethylphenyl)methyl group, (2,4,6-trimethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl)methyl group, (isopropylphenyl)methyl group, (n-butylphenyl)methyl group, (sec-butylphenyl)methyl group, (tert-butylphenyl) methyl group, (n-pentylphenyl)methyl group, (neopentylphenyl)methyl group, (n-hexylphenyl)methyl group, (n-octylphenyl)methyl group, (n-decylphenyl)methyl group, (n-dodecylphenyl) methyl group, (n-tetradecylphenyl )methyl group, naphthylmethyl group, anthracenylmethyl group, etc., and preferably a benzyl group.

These aralkyl groups may be partially substituted with a halogen atom such as a fluorine atom, chlorine atom, bromine atom, iodine atom, alkoxy group such as a methoxy, ethoxy, aryloxy group (such as phenoxy), or aralkyloxy group (such as benzyloxy), or the like.

As the aryl group in the substituents $X^1$, $X^2$, $R^1$, $R^2$, $R^3$, $R^4$, $R^5$ and $R^6$, the aryl group having 6–20 carbon atoms is preferable. Examples of such aryl groups include a phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, n-propylphenyl group, isopropylphenyl group, n-butylphenyl group, sec-butylphenyl group, tert-but ylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, anthracenyl group, etc., and preferably a phenyl group.

These aryl groups may be partially substituted with a halogen atom such as fluorine atom, chlorine atom, bromine atom, iodine atom, alkoxy group such as a methoxy, ethoxy, aryloxy group (such as phenoxy), or aralkyloxy group (such as benzyloxy), and the like.

The substituted silyl group in the substituents $X^1$, $X^2$, $R^1$, $R^2$, $R^3$, $R^4$, $R^5$ and $R^6$ is a silyl group substituted with a hydrocarbon group, and examples of the hydrocarbon group includeanalkylgrouphaving 1–10carbonatoms suchasmethyl group, ethyl group, n-propyl group, isopropyl group, n-butyl group, sec-butyl group, tert-butyl group, isobutyl group, n-pentyl group, n-hexyl group, cyclohexyl group, etc.; and an aryl group (such as phenyl group), etc. Examples of the substituted silyl group having 1–20 carbon atoms include a monosubstituted silyl group having 1–20 carbon atoms such as a methylsilyl group, ethylsilyl group, phenylsilyl group, etc.; a disubsituted silyl group having 2–20 carbon atoms such as dimethylsilyl group, diethylsilyl group, diphenylsilyl group, etc. and a trisubstituted silyl group having 3–20 carbon atoms such as trimethylsilyl group, triethylsilyl group, tri-n-propylsilyl group, triisopropylsilyl group, tri-n-butylsilyl group, tri-sec-butylsilyl group, tri-tert-butylsilyl group, tri-isobutylsilyl group, tert-butyl-dimethylsilyl group, tri-n-pentylsilyl group, tri-n-hexylsilyl group, tricyclohexylsilyl group, triphenylsilyl group, etc., and preferably a trimethylsilyl group, tert-butyldimethylsilyl group or triphenylsilyl group.

The hydrocarbon group of these substituted silyl groups may be substituted with a halogen atom such as a fluorine atom, chlorine atom, bromine atom, iodine atom and the like; and/or an alkoxy group such as methoxy, ethoxy, aryloxy group (such as phenoxy), or aralkyloxy group (such as benzyloxy), and the like.

With respect to the alkoxy group in the substituents $X^1$, $X^2$, $R^1$, $R^2$, $R^3$, $R^4$, $R^5$ and $R^6$, an alkoxy group having 1–20carbon atoms is preferable. Examples of such alkoxy groups include a methoxy group, ethoxy group, n-propoxy group, isopropoxy group, n-butoxy group, sec-butoxy group, t-butoxy group, n-pentoxy group, neopentoxy group, n-hexoxy group, n-octoxy group, n-dodecoxy group, n-pentadecoxy group, n-eicosoxy group, etc., and preferably a methoxy group, ethoxy group or t-butoxy group.

These alkoxy groups may be partially substituted with a halogen atom such as a fluorine atom, chlorine atom, bromine atom, iodine atom and the like; an alkoxy group such as methoxy, ethoxy, aryloxy group (such as phenoxy), or aralkyloxy group (such as benzyloxy), and the like.

With respect to the aralkyloxy group in the substituents $X^1$, $X^2$, $R^1$, $R^2$, $R^3$, $R^4$, $R^5$ and $R^6$, an aralkyloxy group having 7–20 carbon atoms is preferable. Examples of the aralkyloxy group include a benzyloxy group, (2-methylphenyl)methoxy group, (3-methylphenyl) methoxy group, (4-methylphenyl) methoxy group, (2,3-dimethylphenyl) methoxy group, (2,4-dimethylphenyl) methoxy group, (2,5-dimethylphenyl) methoxy group, (2,6-dimethylphenyl) methoxy group, (3,4-dimethylphenyl) methoxy group, (3,5-dimethylphenyl) methoxy group, (2,3,4-trimethylphenyl) methoxy group, (2,3,5-trimethylphenyl) methoxy group, (2,3,6-trimethylphenyl) methoxy group, (2,4,5-trimethylphenyl) methoxy group, (2,4,6-trimethylphenyl) methoxy group, (3,4,5-trimethylphenyl) methoxy group, (2,3,4,5-tetramethylphenyl) methoxy group, (2,3,4,6-tetramethylphenyl) methoxy group, (2,3,5,6-tetramethylphenyl) methoxy group, (pentamethylphenyl) methoxy group, (ethylphenyl) methoxy group, (n-propylphenyl) methoxy group, (isopropylphenyl) methoxy group, (n-butylphenyl) methoxy group, (sec-butylphenyl) methoxy group, (tert-butylphenyl) methoxy group, (n-hexylphenyl) methoxy group, (n-octylphenyl) methoxy group, (n-decylphenyl) methoxy group, (n-tetradecylphenyl) methoxy group, naphthylmethoxy group, anthracenylmethoxy group, etc., and preferably a benzyloxy group.

These aralkyloxy groups may be partially substituted with a halogen atom such as fluorine atom, chlorine atom, bromine atom, iodine atom and the like; an alkoxy group such as methoxy, ethoxy, aryloxy group (such as phenoxy), an aralkyloxy group (such as benzyloxy), and the like.

Examples of the aryloxy group in the substituents $X^1$, $X^2$, $R^1$, $R^2$, $R^3$, $R^4$, $R^5$ and $R^6$ include an aryloxy group having 6–20 carbon atoms such as a phenoxy group, 2-methylphenoxy group, 3-methylphenoxy group, 4-methylphenoxy group, 2,3-dimethylphenoxy group, 2,4-dimethylphenoxy group, 2,5-dimethylphenoxy group, 2,6-dimethylphenoxy group, 3,4-dimethylphenoxy group, 3,5-dimethylphenoxy group, 2,3,4-trimethylphenoxy group, 2,3,5-trimethylphenoxy group, 2,3,6-trimethylphenoxy group, 2,4,5-trimethylphenoxy group, 2,4,6-trimethylphenoxy group, 3,4,5-trimethylphenoxy group, 2,3,4,5-tetramethylphenoxy group, 2,3,4,6-tetramethylphenoxy group, 2,3,5,6-tetramethylphenoxy group, pentamethylphenyloxy group, ethylphenoxy group, n-propylphenoxy group, isopropylphenoxy group, n-butylphenoxy group, sec-butylphenoxy group, tert-butylphenoxy group, n-hexylphenoxy group, n-octylphenoxy group, n-decylphenoxy group, n-tetradecylphenoxy group, naphthoxy group, anthracenoxy group and the like.

These aryloxy groups may be partially substituted with a halogen atom such as a fluorine atom, chlorine atom, bromine atom, iodine atom and the like, an alkoxy group such as methoxy, ethoxy, aryloxy group (such as phenoxy), or an aralkyloxy group (such as benzyloxy), and the like.

The disubstituted amino group in the substituents $X^1$, $X^2$, $R^1$, $R^2$, $R^3$, $R^4$, $R^5$ and $R^6$ is an amino group substituted with two hydrocarbon groups. Examples of the hydrocarbon group include an alkyl group having 1–10 carbon atoms such as a methyl group, ethyl group, n-propyl group, isopropyl group, n-butyl group, sec-butyl group, tert-butyl group, isobutyl group, n-pentyl group, n-hexyl group, cyclohexyl group, etc.; an aryl group having 6–10 carbon atoms (such as phenyl group); an aralkyl group having 7–10 carbon atoms etc. Examples of the amino group disubstituted with hydrocarbon groups having 1–10 carbon atoms include a dimethylamino group, diethylamino group, di-n-propylamino group, diisopropylamino group, di-n-butylamino group, di-sec-butylamino group, di-tert-butylamino group, di-isobutylamino group, tert-butylisopropylamino group, di-n-hexylamino group, di-n-octylamino group, di-n-decylamino group, diphenylamino group, bistrimethylsilylamino group, bis-tert-butyldimethylsilylamino group, etc., and preferably a dimethylamino group or diethylamino group.

These disubstituted amino groups may be substituted partly with a halogen atom such as a fluorine atom, chlorine atom, bromine atom, iodine atom and the like; an alkoxy group such as methoxy group, ethoxy group and the like; an aryloxy group (such as phonoxy group) and the like; or an aralkyloxy group (such as benzyloxy group) and the like.

The substituents $R^1$, $R^2$, $R^3$, $R^4$, $R^5$ and $R^6$ may be optionally combined to form a ring.

$R^1$ is preferably an alkyl group, an aralkyl group, an aryl group, or a substituted silyl group.

$X^1$ and $X^2$ independently and preferably represent a halogen atom, an alkyl group, an aralkyl group, an alkoxy group, an aryloxy group, or a disubstituted amino group, more preferably a halogen atom or an alkoxy group.

Examples of the atom of group XVI in the Periodic Table include an oxygen atom, sulfur atom, selenium atom, and preferably oxygen atom.

Examples of the transition metal complex represented by the general formula [I] include:

methylene(cyclopentadienyl)(3,5-dimethyl-2-phenoxy) titanium dichloride, methylene(cyclopentadienyl)(3-tert-butyl-2-phenoxy) titanium dichloride, methylene(cyclopentadienyl)(3-tert-butyl-5-methyl-2-phenoxy)titanium dichloride, methylene(cyclopentadienyl)(3-phenyl-2-phenoxy) titanium dichloride, methylene(cyclopentadienyl)(3-tert-butyldimethylsilyl-5-methyl-2-phenoxy)titanium dichloride, methylene(cyclopentadienyl)(3-trimethylsilyl-5-methyl-2-phenoxy)titanium dichloride, methylene(cyclopentadienyl)(3-tert-butyl-5-methoxy-2-phenoxy)titanium dichloride, methylene(cyclopentadienyl)(3-tert-butyl-5-chloro-2-phenoxy)titanium dichloride, methylene(methylcyclopentadienyl)(3,5-dimethyl-2-phenoxy)titanium dichloride, methylene(methylcyclopentadienyl)(3-tert-butyl-2-phenoxy)titanium dichloride, methylene(methylcyclopentadienyl)(3-tert-butyl-5-methyl-2-phenoxy)titanium dichloride, methylene(methylcyclopentadienyl)(3-phenyl-2-phenoxy)titanium dichloride, methylene(methylcyclopentadienyl)(3-tert-butyldimethylsilyl-5-methyl-2-phenoxy)titanium dichloride, methylene(methylcyclopentadienyl)(3-trimethylsilyl-5-methyl-2-phenoxy)titanium dichloride, methylene(methylcyclopentadienyl)(3-tert-butyl-5-methoxy-2-phenoxy)titanium dichloride, methylene(methylcyclopentadienyl)(3-tert-butyl-5-chloro-2-phenoxy)titanium dichloride, methylene(tert-butylcyclopentadienyl)(3,5-dimethyl-2-phenoxy) titanium dichloride, methylene(tert-butylcyclopentadienyl)(3-tert-butyl-2-phenoxy) titanium dichloride, methylene(tert-butylcyclopentadienyl)(3-tert-butyl-5-methyl-2-phenoxy)titanium dichloride, methylene(tert-butylcyclopentadienyl)(3-phenyl-2-phenoxy)titanium dichloride, methylene(tert-butylcyclopentadienyl)(3-tert-butyldimethylsilyl-5-methyl-2-phenoxy)titanium dichloride, methylene(tert-butylcyclopentadienyl)(3-trimethylsilyl-5-methyl-2-phenoxy)titanium dichloride, methylene(tert-butylcyclopentadienyl)(3-tert-butyl-5-methoxy-2-phenoxy)titanium dichloride, methylene(tert-butylcyclopentadienyl)(3-tert-butyl-5-chloro-2-phenoxy)titanium dichloride, methylene(tetramethylcyclopentadienyl)(3,5-dimethyl-2-phenoxy)titanium dichloride, methylene(tetramethylcyclopentadienyl)(3-tert-butyl-2-phenoxy)titanium dichloride, methylene(tetramethylcyclopentadienyl)(3-tert-butyl-5-methyl-2-phenoxy)titanium dichloride, methylene(tetramethylcyclopentadienyl)(3-phenyl-2-phenoxy)titanium dichloride, methylene(tetramethylcyclopentadienyl)(3-tert-butyldimethylsilyl-5-methyl-2-phenoxy)titanium dichloride, methylene(tetramethylcyclopentadienyl)(3-trimethylsilyl-5-methyl-2-phenoxy)titanium dichloride, methylene(tetramethylcyclopentadienyl)(3-tert-butyl-5-methoxy-2-phenoxy)titanium dichloride, methylene(tetramethylcyclopentadienyl)(3-tert-butyl-5-chloro-2-phenoxy)titanium dichloride, methylene(trimethylsilylcyclopentadienyl)(3,5-dimethyl-2-phenoxy)titanium dichloride, methylene(trimethylsilylcyclopentadienyl)(3-tert-butyl-2-phenoxy)titanium dichloride, methylene(trimethylsilylcyclopentadienyl)(3-tert-butyl-5-methyl-2-phenoxy)titanium dichloride, methylene(trimethylsilylcyclopentadienyl)(3-phenyl-2-phenoxy)titanium dichloride, methylene(trimethylsilylcyclopentadienyl)(3-tert-butyldimethylsilyl-5-methyl-2-phenoxy)titanium dichloride, methylene(trimethylsilylcyclopentadienyl)(3-trimethylsilyl-5-methyl-2-phenoxy)titanium dichloride, methylene(trimethylsilylcyclopentadienyl)(3-tert-butyl-5-methoxy-2-phenoxy)titanium dichloride, methylene(trimethylsilylcyclopentadienyl)(3-tert-butyl-5-chloro-2-phenoxy)titanium dichloride, methylene(fluorenyl)(3,5-dimethyl-2-phenoxy)titanium dichloride, methylene(fluorenyl)(3-tert-butyl-2-phenoxy)titanium dichloride, methylene(fluorenyl)(3-tert-butyl-5-methyl-2-phenoxy)titanium dichloride, methylene(fluorenyl)(3-phenyl-2-phenoxy)titanium dichloride, methylene(fluorenyl)(3-tert-butyldimethylsilyl-5-methyl-2-phenoxy)titanium dichloride, methylene(fluorenyl)(3-trimethylsilyl-5-methyl-2-phenoxy)titanium dichloride, methylene(fluorenyl)(3-tert-butyl-5-methoxy-2-phenoxy)titanium dichloride, methylene(fluorenyl)(3-tert-butyl-5-chloro-2-phenoxy) titanium dichloride, isopropylidene(cyclopentadienyl)(3,5-dimethyl-2-phenoxy)titanium dichloride,
isopropylidene(cyclopentadienyl)(3-tert-butyl-2-phenoxy)titanium dichloride,
isopropylidene(cyclopentadienyl)(3-tert-butyl-5-methyl-2-phenoxy)titanium dichloride,
isopropylidene(cyclopentadienyl)(3-phenyl-2-phenoxy)titanium dichloride,
isopropylidene(cyclopentadienyl)(3-tert-butyldimethylsilyl-5-methyl-2-phenoxy)titanium dichloride,
isopropylidene(cyclopentadienyl)(3-trimethylsilyl-5-methyl-2-phenoxy)titanium dichloride,
isopropylidene(cyclopentadienyl)(3-tert-butyl-5-methoxy-2-phenoxy)titanium dichloride,
isopropylidene(cyclopentadienyl)(3-tert-butyl-5-chloro-2-phenoxy)titanium dichloride,
isopropylidene(methylcyclopentadienyl)(3,5-dimethyl-2-phenoxy)titanium dichloride,
isopropylidene(methylcyclopentadienyl)(3-tert-butyl-2-phenoxy)titanium dichloride,
isopropylidene(methylcyclopentadienyl)(3-tert-butyl-5-methyl-2-phenoxy)titanium dichloride,
isopropylidene(methylcyclopentadienyl)(3-phenyl-2-phenoxy)titanium dichloride,
isopropylidene(methylcyclopentadienyl)(3-tert-butyldimethylsilyl-5-methyl-2-phenoxy)titanium dichloride, isopropylidene(methylcyclopentadienyl)(3-trimethylsilyl-5-methyl-2-phenoxy)titanium dichloride,
isopropylidene(methylcyclopentadienyl)(3-tert-butyl-5-methoxy-2-phenoxy)titanium dichloride,
isopropylidene(methylcyclopentadienyl)(3-tert-butyl-5-chloro-2-phenoxy)titanium dichloride,
isopropylidene(tert-butylcyclopentadienyl)(3,5-dimethyl-2-phenoxy)titanium dichloride, isopropylidene(tert-butylcyclopentadienyl)(3-tert-butyl-2-phenoxy)titanium dichloride, isopropylidene(tert-butylcyclopentadienyl)(3-tert-butyl-5-methyl-2-phenoxy)titanium dichloride,
isopropylidene(tert-butylcyclopentadienyl)(3-phenyl-2-phenoxy)titanium dichloride, isopropylidene(tert-butylcyclopentadienyl)(3-tert-butyldimethylsilyl-5-methyl-2-phenoxy)titanium dichloride,
isopropylidene(tert-butylcyclopentadienyl)(3-trimethylsilyl-5-methyl-2-phenoxy)titanium dichloride,
isopropylidene(tert-butylcyclopentadienyl)(3-tert-butyl-5-methoxy-2-phenoxy)titanium dichloride,
isopropylidene(tert-butylcyclopentadienyl)(3-tert-butyl-5-chloro-2-phenoxy)titanium dichloride,
isopropylidene(tetramethylcyclopentadienyl)(3,5-dimethyl-2-phenoxy)titanium dichloride,
isopropylidene(tetramethylcyclopentadienyl)(3-tert-butyl-2-phenoxy)titanium dichloride,
isopropylidene(tetramethylcyclopentadienyl)(3-tert-butyl-5-methyl-2-phenoxy)titanium dichloride,
isopropylidene(tetramethylcyclopentadienyl)(3-phenyl-2-phenoxy)titanium dichloride,
isopropylidene(tetramethylcyclopentadienyl)(3-tert-butyldimethylsilyl-5-methyl-2-phenoxy)titanium dichloride, isopropylidene(tetramethylcyclopentadienyl)(3-trimethylsilyl-5-methyl-2-phenoxy)titanium dichloride, isopropylidene(tetramethylcyclopentadienyl)(3-tert-butyl-5-methoxy-2-phenoxy)titanium dichloride,
isopropylidene(tetramethylcyclopentadienyl)(3-tert-butyl-5-chloro-2-phenoxy)titanium dichloride,
isopropylidene(tri-imethylsilylcyclopentadienyl)(3,5-dimethyl-2-phenoxy)titanium dichloride,
isopropylidene(trimethylsilylcyclopentadienyl)(3-tert-butyl-2-phenoxy)titanium dichloride, isopropylidene(trimethylsilylcyclopentadienyl)(3-tert-butyl-5-methyl-2-phenoxy)titanium dichloride,
isopropylidene(trimethylsilylcyclopentadienyl)(3-phenyl-2-phenoxy)titanium dichloride,
isopropylidene(trimethylsilylcyclopentadienyl)(3-tert-butyldimethylsilyl-5-methyl-2-phenoxy)titanium dichloride, isopropylidene(trimethylsilylcyclopentadienyl)(3-trimethylsilyl-5-methyl-2-phenoxy)titanium dichloride, isopropylidene(trimethylsilylcyclopentadienyl)(3-tert-butyl-5-methoxy-2-phenoxy)titanium dichloride,
isopropylidene(trimethylsilylcyclopentadienyl)(3-tert-butyl-5-chloro-2-phenoxy)titanium dichloride,
isopropylidene(fluorenyl)(3,5-dimethyl-2-phenoxy)titanium dichloride, isopropylidene(fluorenyl)(3-tert-butyl-2-phenoxy)titanium dichloride, isopropylidene(fluorenyl)(3-tert-butyl-5-methyl-2-phenoxy)titanium dichloride,
isopropylidene(fluorenyl)(3-phenyl-2-phenoxy)titanium dichloride, isopropylidene(fluorenyl)(3-tert-butyldimethylsilyl-5-methyl-2-phenoxy)titanium dichloride, isopropylidene(fluorenyl)(3-trimethylsilyl-5-methyl-2-phenoxy)titanium dichloride, isopropylidene(fluorenyl)(3-tert-butyl-5-methoxy-2-phenoxy)titanium dichloride,
isopropylidene(fluorenyl)(3-tert-butyl-5-chloro-2-phenoxy)titanium dichloride,
diphenylmethylene(cyclopentadienyl)(3,5-dimethyl-2-phenoxy)titanium dichloride, diphenylmethylene(cyclopentadienyl)(3-tert-butyl-2-phenoxy)titanium dichloride, diphenylmethylene (cyclopentadienyl)(3-tert-butyl-5-methyl-2-phenoxy)titanium dichloride,
diphenylmethylene (cyclopentadienyl)(3-phenyl-2-phenoxy)titanium dichloride, diphenylmethylene (cyclopentadienyl)(3-tert-butyldimethylsilyl-5-methyl-2-phenoxy)titanium dichloride, diphenylmethylene (cyclopentadienyl)(3-trimethylsilyl-5-methyl-2-phenoxy)titanium dichloride, diphenylmethylene (cyclopentadienyl)(3-tert-butyl-5-methoxy-2-phenoxy)titanium dichloride, diphenylmethylene (cyclopentadienyl)(3-tert-butyl-5-chloro-2-phenoxy)titanium dichloride, diphenylmethylene (methylcyclopentadienyl)(3,5-dimethyl-2-phenoxy)titanium dichloride, diphenylmethylene (methylcyclopentadienyl)(3-tert-butyl-2-phenoxy)titanium dichloride,
diphenylmethylene (methylcyclopentadienyl) (3-tert-butyl-5-methyl-2-phenoxy)titanium dichloride, diphenylmethylene (methylcyclopentadienyl) (3-phenyl-2-phenoxy)titanium dichloride, diphenylmethylene (methylcyclopentadienyl) (3-tert-butyldimethylsilyl-5-methyl-2-phenoxy)titanium dichloride, diphenylmethylene (methylcyclopentadienyl) (3-trimethylsilyl-5-methyl-2-phenoxy)titanium dichloride,
diphenylmethylene (methylcyclopentadienyl) (3-tert-butyl-5-methoxy-2-phenoxy)titanium dichloride, diphenylmethylene (methylcyclopentadienyl) (3-tert-butyl-5-chloro-2-phenoxy)titanium dichloride, diphenylmethylene (tert-butylcyclopentadienyl) (3,5-dimethyl-2-phenoxy)titanium dichloride, diphenylmethylene (tert-butylcyclopentadienyl) (3-tert-butyl-2-phenoxy)titanium dichloride, diphenylmethylene (tert-butylcyclopentadienyl) (3-tert-butyl-5-methyl-2-phenoxy)titanium dichloride, diphenylmethylene (tert-butylcyclopentadienyl) (3-phenyl-2-phenoxy)titanium dichloride, diphenylmethylene (tert-butylcyclopentadienyl) (3-tert-butyldimethylsilyl-5-methyl-2-phenoxy)titanium dichloride, diphenylmethylene (tert-butylcyclopentadienyl) (3-trimethylsilyl-5-methyl-2-phenoxy)titanium dichloride, diphenylmethylene (tert-butylcyclopentadienyl) (3-tert-butyl-5-methoxy-2-phenoxy)titanium dichloride, diphenylmethylene (tert-butylcyclopentadienyl) (3-tert-butyl-5-chloro-2-phenoxy)titanium dichloride, diphenylmethylene (tetramethylcyclopentadienyl) (3,5-dimethyl-2-phenoxy)titanium dichloride, diphenylmethylene (tetramethylcyclopentadienyl) (3-tert-butyl-2-phenoxy)titanium dichloride, diphenylmethylene (tetramethylcyclopentadienyl) (3-tert-butyl-5-methyl-2-phenoxy)titanium dichloride, diphenylmethylene (tetramethylcyclopentadienyl) (3-phenyl-2-phenoxy) titanium dichloride, diphenylmethylene (tetramethylcyclopentadienyl) (3-tert-butyldimethylsilyl-5-methyl-2-phenoxy)titanium dichloride, diphenylmethylene (tetramethylcyclopentadienyl) (3-trimethylsilyl-5-methyl-2-phenoxy)titanium dichloride, diphenylmethylene (tetramethylcyclopentadienyl) (3-tert-butyl-5-methoxy-2-phenoxy)titanium dichloride, diphenylmethylene (tetramethylcyclopentadienyl) (3-tert-butyl-5-chloro-2-phenoxy)titanium dichloride, diphenylmethylene (trimethylsilylcyclopentadienyl) (3,5-dimethyl-2-phenoxy)titanium dichloride, diphenylmethylene (trimethylsilylcyclopentadienyl) (3-tert-butyl-2-phenoxy)titanium dichloride, diphenylmethylene (trimethylsilylcyclopentadienyl) (3-tert-butyl-5-methyl-2-phenoxy)titanium dichloride, diphenylmethylene (trimethylsilylcyclopentadienyl) (3-phenyl-2-phenoxy)titanium dichloride, diphenylmethylene (trimethylsilylcyclopentadienyl) (3-tert-butyldimethylsilyl-5-methyl-2-phenoxy)titanium dichloride, diphenylmethylene (trimethylsilylcyclopentadienyl) (3-trimethylsilyl-5-methyl-2-phenoxy)titanium dichloride, diphenylmethylene (trimethylsilylcyclopentadienyl) (3-tert-butyl-5-methoxy-2-phenoxy)titanium dichloride, diphenylmethylene (trimethylsilylcyclopentadienyl) (3-tert-butyl-5-chloro-2-phenoxy)titanium dichloride, diphenylmethylene (fluorenyl) (3,5-dimethyl-2-phenoxy) titanium dichloride, diphenylmethylene (fluorenyl) (3-tert-butyl-2-phenoxy)titanium dichloride, diphenylmethylene (fluorenyl) (3-tert-butyl-5-methyl-2-phenoxy)titanium dichloride, diphenylmethylene (fluorenyl) (3-phenyl-2-phenoxy)titanium dichloride, diphenylmethylene (fluorenyl) (3-tert-butyldimethylsilyl-5-methyl-2-phenoxy) titanium dichloride, diphenylmethylene (fluorenyl) (3-trimethylsilyl-5-methyl-2-phenoxy)titanium dichloride, diphenylmethylene (fluorenyl) (3-tert-butyl-5-methoxy-2-phenoxy)titanium dichloride, diphenylmethylene (fluorenyl) (3-tert-butyl-5-chloro-2-phenoxy)titaniumdichloride, etc., transitionmetal-complexes wherein J in the chemical formula [I] is a carbon atom, such as compounds wherein titanium of these compounds is replaced by zirconium or hafnium, compounds wherein the dichloride of these compounds is replaced by dibromide, diiodide, bis (dimethylamide), bis(diethylamide), di-n-butoxide or diisopropoxide, compounds wherein cyclopentadienyl of these compounds is replaced by dimethylcyclopentadienyl, trimethylcyclopentadienyl, n-butylcyclopentadienyl, tert-butyldimethylsilylcyclopentadienyl or indenyl, and compounds wherein 3,5-dimethyl-2-phenoxy of these compounds is replaced by 2-phenoxy, 3-methyl-2-phenoxy, 3,5-di-tert-butyl-2-phenoxy, 3-phenyl-5-methyl-2-phenoxy, 3-tert-butyldimethylsilyl-2-phenoxy or 3-trimethylsilyl-2-phenoxy; and dimethylsilyl(cyclopentadienyl)(2-phenoxy)titanium dichloride, dimethylsilyl(cyclopentadienyl)(3-methyl-2-phenoxy) titanium dichloride, dimethylsilyl(cyclopentadienyl)(3,5-dimethyl-2-phenoxy)titanium dichloride, dimethylsilyl(cyclopentadienyl)(3-tert-butyl-2-phenoxy) titanium dichloride, dimethylsilyl(cyclopentadienyl)(3-tert-butyl-5-methyl-2-phenoxy)titanium dichloride, dimethylsilyl(cyclopentadienyl)(3,5-di-tert-butyl-2-phenoxy)titanium dichloride, dimethylsilyl(cyclopentadienyl)(5-methyl-3-phenyl-2-phenoxy)titanium dichloride, dimethylsilyl(cyclopentadienyl)(3-tert-butyldimethylsilyl-5-methyl-2-phenoxy)titanium dichloride, dimethylsilyl(cyclopentadienyl)(5-methyl-3-trimethylsilyl-2-phenoxy)titanium dichloride, dimethylsilyl(cyclopentadienyl)(3-tert-butyl-5-methoxy-2-phenoxy)titanium dichloride, dimethylsilyl(cyclopentadienyl)(3-tert-butyl-5-chloro-2-phenoxy)titanium dichloride, dimethylsilyl(cyclopentadienyl)(3,5-diamyl-2-phenoxy) titanium dichloride, dimethylsilyl(methylcyclopentadienyl)(2-phenoxy) titanium dichloride, dimethylsilyl (methylcyclopentadienyl)(3-methyl-2-phenoxy) titanium dichloride, dimethylsilyl(methylcyclopentadienyl)(3,5-dimethyl-2-phenoxy)titanium dichloride, dimethylsilyl(methylcyclopentadienyl)(3-tert-butyl-2-phenoxy)titanium dichloride, dimethylsilyl(methylcyclopentadienyl)(3-tert-butyl-5-methyl-2-phenoxy)titanium dichloride, dimethylsilyl(methylcyclopentadienyl)(3,5-di-tert-butyl-2-phenoxy)titanium dichloride, dimethylsilyl(methylcyclopentadienyl)(5-methyl-3-phenyl-2-phenoxy)titanium dichloride, dimethylsilyl(methylcyclopentadienyl)(3-tert-butyldimethylsilyl-5-methyl-2-phenoxy)titanium dichloride, dimethylsilyl(methylcyclopentadienyl)(5-methyl- 3-trimethylsilyl-2-phenoxy)titanium dichloride, dimethylsilyl(methylcyclopentadienyl)(3-tert-butyl-5-methoxy-2-phenoxy)titanium dichloride, dimethylsilyl(methylcyclopentadienyl)(3-tert-butyl-5-chloro-2-phenoxy)titanium dichloride,
dimethylsilyl(methylcyclopentadienyl)(3,5-diamyl-2-phenoxy)titanium dichloride, dimethylsilyl(n-butylcyclopentadienyl)(2-phenoxy)titanium dichloride, dimethylsilyl(n-butylcyclopentadienyl)(3-methyl-2-phenoxy)titanium dichloride, dimethylsilyl(n-butylcyclopentadienyl)(3,5-dimethyl-2-phenoxy)titanium dichloride, dimethylsilyl(n-butylcyclopentadienyl)(3-tert-butyl-2-phenoxy)titanium dichloride,
dimethylsilyl(n-butylcyclopentadienyl)(3-tert-butyl-5-methyl-2-phenoxy)titanium dichloride, dimethylsilyl(n-butylcyclopentadienyl)(3,5-di-tert-butyl-2-phenoxy)titanium dichloride, dimethylsilyl(n-butylcyclopentadienyl)(5-methyl-3-phenyl-2-phenoxy)titanium dichloride,
dimethylsilyl(n-butylcyclopentadienyl)(3-tert-butyldimethylsilyl-5-methyl-2-phenoxy)titanium dichloride, dimethylsilyl(n-butylcyclopentadienyl)(5-methyl-3-trimethylsilyl-2-phenoxy)titanium dichloride, dimethylsilyl(n-butylcyclopentadienyl)(3-tert-butyl-5-methoxy-2-phenoxy)titanium dichloride, dimethylsilyl(n-butylcyclopentadienyl)(3-tert-butyl-5-chloro-2-phenoxy)titanium dichloride, dimethylsilyl(n-butylcyclopentadienyl)(3,5-diamyl-2-phenoxy)titanium dichloride, dimethylsilyl(tert-butylcyclopentadienyl)(2-phenoxy)titanium dichloride, dimethylsilyl(tert-butylcyclopentadienyl)(3-methyl-2-phenoxy)titanium dichloride, dimethylsilyl(tert-butylcyclopentadienyl)(3,5-dimethyl-2-phenoxy)titanium dichloride, dimethylsilyl(tert-butylcyclopentadienyl)(3-tert-butyl-2-phenoxy)titanium dichloride,
dimethylsilyl(tert-butylcyclopentadienyl)(3-tert-butyl-5-methyl-2-phenoxy)titanium dichloride, dimethylsilyl(tert-butylcyclopentadienyl)(3,5-di-tert-butyl-2-phenoxy)titanium dichloride, dimethylsilyl(tert-butylcyclopentadienyl)(5-methyl-3-phenyl-2-phenoxy)titanium dichloride,
dimethylsilyl(tert-butylcyclopentadienyl)(3-tert-butyldimethylsilyl-5-methyl-2-phenoxy)titanium dichloride, dimethylsilyl(tert-butylcyclopentadienyl)(5-methyl-3-trimethylsilyl-2-phenoxy)titanium dichloride, dimethylsilyl(tert-butylcyclopentadienyl)(3-tert-butyl-5-methoxy-2-phenoxy)titanium dichloride, dimethylsilyl(tert-butylcyclopentadienyl)(3-tert-butyl-5-chloro-2-phenoxy)titanium dichloride, dimethylsilyl(tert-butylcyclopentadienyl)(3,5-diamyl-2-phenoxy)titanium dichloride, dimethylsilyl(tetramethylcyclopentadienyl)(2-phenoxy)titanium dichloride,
dimethylsilyl(tetramethylcyclopentadienyl)(3-methyl-2-phenoxy)titanium dichloride,
dimethylsilyl(tetramethylcyclopentadienyl)(3,5-dimethyl-2-phenoxy)titanium dichloride,
dimethylsilyl(tetramethylcyclopentadienyl)(3-tert-butyl-2-phenoxy)titanium dichloride,
dimethylsilyl(tetramethylcyclopentadienyl)(3-tert-butyl-5-methyl-2-phenoxy)titanium dichloride,
dimethylsilyl(tetramethylcyclopentadienyl)(3,5-di-tert-butyl-2-phenoxy)titanium dichloride,
dimethylsilyl(tetramethylcyclopentadienyl)(5-methyl-3-phenyl-2-phenoxy)titanium dichloride,
dimethylsilyl(tetramethylcyclopentadienyl)(3-tert-butyldimethylsilyl-5-methyl-2-phenoxy)titanium dichloride,
dimethylsilyl(tetramethylcyclopentadienyl)(5-methyl-3-trimethylsilyl-2-phenoxy)titanium dichloride,
dimethylsilyl(tetramethylcyclopentadienyl)(3-tert-butyl-5-methoxy-2-phenoxy)titanium dichloride,
dimethylsilyl(tetramethylcyclopentadienyl)(3-tert-butyl-5-chloro-2-phenoxy)titanium dichloride,
dimethylsilyl(tetramethylcyclopentadienyl)(3,5-diamyl-2-phenoxy)titanium dichloride,
dimethylsilyl(trimethylsilylcyclopentadienyl)(2-phenoxy)titanium dichloride,
dimethylsilyl(trimethylsilylcyclopentadienyl)(3-methyl-2-phenoxy)titanium dichloride,
dimethylsilyl(trimethylsilylcyclopentadienyl)(3,5-dimethyl-2-phenoxy)titanium dichloride,
dimethylsilyl(trimethylsilylcyclopentadienyl)(3-tert-butyl-2-phenoxy)titanium dichloride,
dimethylsilyl(trimethylsilylcyclopentadienyl)(3-tert-butyl-5-methyl-2-phenoxy)titanium dichloride,
dimethylsilyl(trimethylsilylcyclopentadienyl)(3,5-di-tert-butyl-2-phenoxy)titanium dichloride,
dimethylsilyl(trimethylsilylcyclopentadienyl)(5-methyl-3-phenyl-2-phenoxy) titanium dichloride,
dimethylsilyl(trimethylsilylcyclopentadienyl)(3-tert-butyldimethylsilyl-5-methyl-2-phenoxy)titanium dichloride, dimethylsilyl(trimethylsilylcyclopentadienyl)(5-methyl-3-trimethylsilyl-2-phenoxy)titanium dichloride,
dimethylsilyl(trimethylsilylcyclopentadienyl)(3-tert-butyl-5-methoxy-2-phenoxy)titanium dichloride,
dimethylsilyl(trimethylsilylcyclopentadienyl)(3-tert-butyl-5-chloro-2-phenoxy)titanium dichloride,
dimethylsilyl(trimethylsilylcyclopentadienyl)(3,5-diamyl-2-phenoxy)titanium dichloride, dimethylsilyl(indenyl)(2-phenoxy)titanium dichloride, dimethylsilyl(indenyl)(3-methyl-2-phenoxy)titanium dichloride,
dimethylsilyl(indenyl)(3,5-dimethyl-2-phenoxy)titanium dichloride, dimethylsilyl(indenyl)(3-tert-butyl-2-phenoxy)titanium dichloride, dimethylsilyl(indenyl)(3-tert-butyl-5-methyl-2-phenoxy)titanium dichloride, dimethylsilyl(indenyl)(3,5-di-tert-butyl-2-phenoxy)titanium dichloride, dimethylsilyl(indenyl)(5-methyl-3-phenyl-2-phenoxy)titanium dichloride,
dimethylsilyl(indenyl)(3-tert-butyldimethylsilyl-5-methyl-2-phenoxy)titanium dichloride,
dimethylsilyl(indenyl)(5-methyl-3-trimethylsilyl-2-phenoxy)titanium dichloride, dimethylsilyl(indenyl)(3-tert-butyl-5-methoxy-2-phenoxy)titanium dichloride, dimethylsilyl(indenyl)(3-tert-butyl-5-chloro-2-phenoxy)titanium dichloride, dimethylsilyl(indenyl)(3,5-diamyl-2-phenoxy)titanium dichloride,
dimethylsilyl(fluorenyl)(2-phenoxy)titanium dichloride,
dimethylsilyl(fluorenyl)(3-methyl-2-phenoxy)titanium dichloride, dimethylsilyl(fluorenyl)(3,5-dimethyl-2-phenoxy)titanium dichloride, dimethylsilyl(fluorenyl)(3-tert-butyl-2-phenoxy)titanium dichloride,
dimethylsilyl(fluorenyl)(3-tert-butyl-5-methyl-2-phenoxy)titanium dichloride,
dimethylsilyl(fluorenyl)(3,5-di-tert-butyl-2-phenoxy) titanium dichloride, dimethylsilyl(fluorenyl)(5-methyl-3-phenyl-2-phenoxy)titanium dichloride,
dimethylsilyl(fluorenyl)(3-tert-butyldimethylsilyl-5-methyl-2-phenoxy)titanium dichloride,
dimethylsilyl(fluorenyl)(5-methyl-3-trimethylsilyl-2-phenoxy)titanium dichloride, dimethylsilyl(fluorenyl)(3-tert-butyl-5-methoxy-2-phenoxy)titanium dichloride, dimethylsilyl(fluorenyl)(3-tert-butyl-5-chloro-2-phenoxy)titanium dichloride, dimethylsilyl(fluorenyl)(3,5-diamyl-2-phenoxy)titanium dichloride, dimethylsilyl(tetramethyl cyclopentadienyl)(1-naphthoxy-2-il)titanium dichloride, etc., the compounds wherein the (cyclopentadienyl) of these compounds have been changed to (dimethylcyclopentadienyl), (trimethylcyclopentadienyl), (ethylcyclopentadienyl), (n-propylcyclopentadienyl), (isopropylcyclopentadienyl), (sec-butylcyclopentadienyl), (isobutylcyclopentadienyl), (tert-butyldimethylsilyl cyclopentadienyl), (phenylcyclopentadienyl), (methylindenyl), or (phenylindenyl); the compounds wherein (2-phenoxy) has been changed to (3-phenyl 2-phenoxy), (3-trimethyl silyl- 2-phenoxy), or (3-tert-butyl dimethylsilyl-2-phenoxy); the compounds wherein dimethyl silyl has been changed to diethyl silyl, diphenyl silyl, or dimethoxy silyl; the compounds wherein titanium has been changed to zirconium or hafnium; the compounds wherein dichloride has been changed to dibromide, diiodide, bis(dimethylamide), bis(diethylamide), di-n-buthoxide, or diisopropoxide, which are transition metal complexes wherein J in the chemical formula [I] is an atom of the group XIV in the Periodic Table of the elements other than the carbon atoms.

Examples of the transition metal complex represented by the general formula [II] include:

μ-oxo bis{isopropylidene(cyclopentadienyl)(2-phenoxy)titanium chloride},

μ-oxo bis{isopropylidene(cyclopentadienyl)(2-phenoxy)titanium methoxide},

μ-oxo bis{isopropylidene(cyclopentadienyl)(3-tert-butyl-5-methyl-2-phenoxy)titanium chloride}, μ-oxo bis{isopropylidene(cyclopentadienyl)(3-tert-butyl-5-methyl-2-phenoxy)titanium methoxide}, μ-oxo bis{isopropylidene(methylcyclopentadienyl)(2-phenoxy)titanium chloride}, μ-oxo bis{isopropylidene(methylcyclopentadienyl)(2-phenoxy)titanium methoxide}, μ-oxo bis{isopropylidene(methylcyclopentadienyl)(3-tert-butyl-5-methyl-2-phenoxy)titanium chloride}, μ-oxo bis{isopropylidene(methylcyclopentadienyl)(3-tert-butyl-5-methyl-2-phenoxy)titanium methoxide}, μ-oxo bis{isopropylidene(tetramethylcyclopentadienyl)(2-phenoxy)titanium chloride}, μ-oxo bis{isopropylidene(tetramethylcyclopentadienyl)(2-phenoxy)titanium methoxide}, μ-oxo bis{isopropylidene(tetramethylcyclopentadienyl)(3-tert-butyl-5-methyl-2-phenoxy)titanium chloride}, μ-oxo bis{isopropylidene(tetramethylcyclopentadienyl)(3-tert-butyl-5-methyl-2-phenoxy)titanium methoxide}, μ-oxo bis{dimethylsilylene(cyclopentadienyl)(2-phenoxy)titanium chloride}, μ-oxo bis{dimethylsilylene(cyclopentadienyl)(2-phenoxy)titanium methoxide}, μ-oxo bis{dimethylsilylene(cyclopentadienyl)(3-tert-butyl-5-methyl-2-phenoxy)titanium chloride}, μ-oxo bis{dimethylsilylene(cyclopentadienyl)(3-tert-butyl-5-methyl-2-phenoxy)titanium methoxide}, μ-oxo bis{dimethylsilylene(methylcyclopentadienyl)(2-phenoxy)titanium chloride}, μ-oxo bis{dimethylsilylene(methylcyclopentadienyl)(2-phenoxy)titanium methoxide}, μ-oxo bis{dimethylsilylene(methylcyclopentadienyl)(3-tert-butyl-5-methyl-2-phenoxy)titanium chloride}, μ-oxo bis{dimethylsilylene(methylcyclopentadienyl)(3-tert-butyl-5-methyl-2-phenoxy)titanium methoxide}, μ-oxo bis{dimethylsilylene(tetramethylcyclopentadienyl)(2-phenoxy)titanium chloride}, μ-oxo bis{dimethylsilylene(tetramethylcyclopentadienyl)(2-phenoxy)titanium methoxide}, μ-oxo bis{dimethylsilylene(tetramethylcyclopentadienyl)(3-tert-butyl-5-methyl-2-phenoxy)titanium chloride} and μ-oxo bis{dimethylsilylene(tetramethylcyclopentadienyl)(3-tert-butyl-5-methyl-2-phenoxy)titanium methoxide}.

Examples of the transition metal complex represented by the general formula [III] include:

di-μ-oxo bis{isopropylidene(cyclopentadienyl)(2-phenoxy)titanium}, di-μ-oxo bis{isopropylidene(cyclopentadienyl)(3-tert-butyl-5-methyl-2-phenoxy)titanium}, di-μ-oxo bis{isopropylidene(methylcyclopentadienyl)(2-phenoxy)titanium}, di-μ-oxo bis{isopropylidene(methylcyclopentadienyl)(3-tert-butyl-5-methyl-2-phenoxy)titanium}, di-μ-oxo bis{isopropylidene(tetramethylcyclopentadienyl)(2-phenoxy)titanium}, di-μ-oxo bis{isopropylidene(tetramethylcyclopentadienyl)(3-tert-butyl-5-methyl-2-phenoxy)titanium}, di-μ-oxo bis{dimethylsilylene(cyclopentadienyl)(2-phenoxy)titanium}, di-μ-oxo bis{dimethylsilylene(cyclopentadienyl)(3-tert-butyl-5-methyl-2-phenoxy)titanium}, di-μ-oxo bis{dimethylsilylene(methylcyclopentadienyl)(2-phenoxy)titanium}, di-μ-oxo bis{dimethylsilylene(methylcyclopentadienyl)(3-tert-butyl-5-methyl-2-phenoxy)titanium}, di-μ-oxo bis{dimethylsilylene(tetramethylcyclopentadienyl)(2-phenoxy)titanium} and di-μ-oxo bis{dimethylsilylene(tetramethylcyclopentadienyl)(3-tert-butyl-5-methyl-2-phenoxy)titanium}.

The transition metal complex represented by the general formula [I] can besynthesized according to the method described in WO 97/03992, which is incorporated herein by reference in its entirely.

The transition metal compound represented by the general formula [II] or [III] can be prepared by reacting a transition metal compound [I] with 1 or 2 equivalent amounts of water or oxygen.

Next, explanation is given on the aluminum compound (B).

Aluminum compounds (B) are one or more of aluminum compounds selected from the following (B1)–(B3).

(B1) organoaluminum compound represented by the general formula $E^1{}_a AlZ_{2-a}$, (B2) cyclic aluminoxane having a structure represented by the general formula $\{-Al(E^2)-O-\}_b$ and (B3) linear aluminoxane having a structure represented by the general formula $E^3\{-Al(E^3)-O-\}_c AlE^3{}_2$ (wherein $E^1$, $E^2$ and $E^3$ respectively represent a hydrocarbon group and all of $E^1$, $E^2$ and $E^3$ may be the same or different; Z represents a hydrogen atom or a halogen atom and all of Z may be the same or different; a satisfies the following equation: $0<a\leq3$; b represents an integer of 2 or more; and c represents an integer of 1 or more).

As the hydrocarbon group in $E^1$, $E^2$ and $E^3$, the hydrocarbon group having carbon atoms of 1–8 is preferable, and alkyl group is more preferable.

Specific examples of the organoaluminum compound (B1) represented by the general formula $E^1_a AlZ_{3-a}$ include trialkylaluminum such as trimethylaluminum, triethylaluminum, tripropylaluminum, triisobutylaluminum, trihexylaluminum, etc.; dialkylaluminum chloride such as dimethylaluminum chloride, diethylaluminum chloride, dipropylaluminum chloride, diisobutylaluminum chloride, dihexylaluminum chloride, etc.; alkylaluminum dichloride such as methylaluminum dichloride, ethylaluminum dichloride, propylaluminum dichloride, isobutylaluminum dichloride, hexylaluminum dichloride, etc.; and dialkylaluminum hydride such as dimethylaluminum hydride, diethylaluminum hydride, dipropylaluminum hydride, diisobutylaluminum hydride, dihexylaluminum hydride, etc.

Among them, trialkylaluminum is preferable, and triethylaluminum and triisobutylaluminum are more preferable.

Specific examples of $E^2$ and $E^3$ in the cyclic aluminoxane (B2) having a structure represented by the general formula $\{-Al(E^2)-O-\}_b$ and linear aluminoxane (B3) having a structure represented by the general formula $E^3\{-Al(E^3)-O-\}_c AlE^3_2$ include alkyl groups such as methyl group, ethyl group, normal propyl group, isopropyl group, normal butyl group, isobutyl group, normal pentyl group, neopentyl group and the like. b is an integer of not less than 2, and c is an integer of not less than 1. $E^2$ and $E^3$ are preferably methyl groups or isobutyl groups, b is preferably 2 to 40 and c is preferably 1 to 40.

The above aluminoxane is produced by various methods. The method is not specifically limited, and the aluminoxane may be produced according to known methods. For example, it is produced by bringing a solution prepared by dissolving a trialkylaluminum (e.g. trimethylaluminum, etc.) in a suitable solvent (e.g. benzene, aliphatic hydrocarbon, etc.), into contact with water. There can also be used a method of bringing atrialkylaluminum (e.g. trimethylaluminum, etc.) into contact with a metal salt containing crystallization water (e.g. copper sulfate hydrate, etc.).

Boron compound (C) is explained as follows:

As the boron compound (C), any one of boron compound (C1) represented by the general formula $BQ^1Q^2Q^3$, boron compound(C2) represented by the general formula $G^+(BQ^1Q^2Q^3Q^4)^-$ and boron compound(C3) represented by the general formula $(L-H)^+(BQ^1Q^2Q^3Q^4)^-$ can be used.

In the boron compound (C1) represented by the general formula $BQ^1Q^2Q^3$, B represents a trivalent boron atom in the valence state; and $Q^1$ to $Q^3$ may be the same or different and represent a halogen atom, a hydrocarbon group, a halogenated hydrocarbon group, a substituted silyl group, a alkoxy group or a disubstituted amino group. $Q^1$ to $Q^3$ represent preferably a halogen atom, a hydrocarbon group having carbon atoms of 1–20, a halogenated hydrocarbon group having carbon atoms of 1–20, a substituted silyl group having carbon atoms of 1–20, a alkoxy group having carbon atoms of 1–20 or a disubstituted amino group having carbon atoms of 2–20. $Q^1$ to $Q^3$ represent more preferably a halogen atom, a hydrocarbon group having carbon atoms of 1–20 or a halogenated hydrocarbon group having carbon atoms of 1–20. $Q^1$ to $Q^4$ represent further more preferably a fluorinated hydrocarbon group having carbon atoms of 1–20 and having at least one fluorine atom. $Q^1$ to $Q^4$ represent especially preferably a fluorinated aryl group having carbon atoms of 6–20 and having at least one fluorine atom.

Specific examples of the compound (C1) include tris (pentafluorophenyl)borane, tris(2,3,5,6-tetrafluorophenyl) borane, tris(2,3,4,5-tetrafluorophenyl)borane, tris(3,4,5-trifluorophenyl)borane, tris(2,3,4-trifluorophenyl)borane, phenylbis(pentafluorophenyl)borane, etc. Among them, tris (pentafluorophenyl)borane is most preferable.

In the boron compound (C2) represented by the general formula $G^+(BQ^1Q^2Q^3Q^4)^-$, $G^+$ represents an inorganic or organic cation; B represents a trivalent boron in the valence state; and $Q^1$ to $Q^4$ are the same as $Q^1$ to $Q^3$ in the above (C1).

In the compound represented by the general formula $G^+(BQ^1Q^2Q^3Q^4)^-$, specific examples of $G^+$ as an inorganic cation include ferrocenium cation, alkyl-substituted ferrocenium cation, silver cation, etc. and specific examples of $G^+$ as an organic cation include triphenylmethyl cation, etc. $G^+$ preferably carbenium cation, more preferably triphenylmethyl cation.

Examples of $(BQ^1Q^2Q^3Q^4)^-$ include tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,3,4-trifluorophenyl) borate, phenyltris(pentafluorophenyl)borate, tetrakis(3, 5-bistrifluorophenylmethyl)borate and the like.

Examples of the specific combination of them include ferrocenium tetrakis(pentafluorophenyl)borate, 1,1'-dimethylferrocenium tetrakis(pentafluorophenyl)borate, silver tetrakis(pentafluorophenyl)borate, triphenylmethyl tetrakis(pentafluorophenyl)borate, triphenylmethyl tetrakis (3,5-bistrifluorophenyl)borate and the like. Among them, triphenylmethyl tetrakis(pentafluorophenyl)borate is most preferable.

In the compound (C3) represented by the general formula $(L-H)^+(BQ^1Q^2Q^3Q^4)^-$, L represents a neutral Lewis base; $(L-H)^+$ represents a Brønsted acid; B represents a trivalent boron in the valence state; and $Q^1$ to $Q^4$ are the same as $Q^1$ to $Q^3$ in the above (C1).

In the compound represented by the general formula $(L-H)^+(BQ^1Q^2Q^3Q^4)^-$, specific examples of $(L-H)^+$ as Brønsted acid include trialkyl-substituted ammonium, N,N-dialkylanilinium, dialkylammonium, triarylphosphonium, etc. and specific examples of $(BQ^1Q^2Q^3Q^4)^-$ include the same one as that described above.

Examples of the specific combination of them include triethylammonium tetrakis(pentafluorophenyl)borate, tripropylammonium tetrakis(pentafluorophenyl)borate, tri(n-butyl)ammonium tetrakis(pentafluorophenyl) borate, tri(n-butyl)ammonium tetrakis(3,5-bistrifluoromethylphenyl)borate, N,N-dimethylanilium tetrakis(pentafluorophenyl)borate, N,N-diethylanilium tetrakis(pentafluorophenyl)borate, N,N-2,4,6-pentamethylanilium tetrakis(pentafluorophenyl)borate, N,N-dimethylanilium tetrakis(3,5-bistrifluoromethylphenyl)borate, diisopropylammonium tetrakis(pentafluorophenyl)borate, dicyclohexylammonium tetrakis(pentafluorophenyl)borate, triphenylphosphonium tetrakis(pentafluorophenyl) borate, tri(methylphenyl)phosphonium tetrakis (pentafluorophenyl)borate, tri(dimethylphenyl) phosphonium tetrakis(pentafluorophenyl)borate, etc. Among them, tri(n-butyl)ammonium tatrakis (pentafluoro)borate or N,N-dimethylanilinium tetrakis (pentafluorophenyl)borate is most preferable.

In copolymerizing, there is used a catalyst for olefin polymerization comprising the transition metal complex (A) represented by the general formula (I) and above-mentioned compound(s) (B) and/or (C) In case of using a catalyst for olef in polymerization comprising the two components of (A) and (B), preferable compounds (B) are above-mentioned cyclic aluminoxane (B2) and/or the linear aluminoxane (B3). As the other preferable mode of a catalyst for olefin polymerization, there can be given a catalyst for olefin polymerization comprising (A), (B) and (C), wherein said (B1) is preferable.

Each catalyst component is used so that a molar ratio of (B) to (A) is preferably from 0.1 to 10000, more preferably from 5 to 2000, and a molar ratio of (C) to (A) is preferably from 0.01 to 100, more preferably from 0.5 to 20.

With regard to the concentration of each catalyst component used in the state of a solution or in a state of suspension in the solvent, optional selection is made depending on the capacity of the apparatus for supplying each component to the polymerization reactor and the like. Each component is used so that an amount of (A) is preferably from 0.01 to 500 $\mu$mol/g, more preferably from 0.05 to 100 $\mu$mol/g, further preferably from 0.05 to 50 $\mu$mol/g, an amount of (B) is preferably from 0.01 to 10000 $\mu$mol/g, more preferably from 0.1 to 5000 $\mu$mol/g, further preferably from 0.1 to 2000 $\mu$mol/g, in terms of Al atom, and an amount of (C) is preferably from 0.01 to 500 $\mu$mol/g, more preferably from 0.05 to 200 $\mu$mol/g, further preferably from 0.05 to 100 g mol/g.

The copolymer of the present invention is produced by the solution polymerization using, for example, an aliphatic hydrocarbon such as butane, pentane, hexane, heptane, octane or the like, an aromatic hydrocarbon such as benzene, toluene or the like, a halogenated hydrocarbon such as methylene dichloride as a solvent, the slurry polymerization, the gaseous phase polymerization effected in monomers in vapor phase. In addition, the copolymer is produced either by continuous polymerization or by batch polymerization. The temperature for polymerization are preferably within a range of −50 to 250° C., in particular, preferably within a range of −20 to 200° C. The pressure for polymerization is preferably the atmospheric pressure to 100 kg/cm$^2$G. Generally, the period for polymerization is suitably selected depending on the kind of catalyst used and reaction apparatus and are preferably within a range of 1 minute to 20 hours. It is also possible to add a chain transfer agent such as hydrogen or the like in order to adjust the molecular weight of the polymer.

Preferred processes for carrying out the present invention include, for example, the solution polymerization using an aliphatic hydrocarbon such as hexane, heptane, octane or the like as a solvent. The polymerization may be carried out either by the continuous system or by the batch system. The important part of the invention can be attained by carrying out the polymerization in one-vessel polymerization alone but the polymerization may be carried out in two or more reaction vessels joined parallel or directly. Specifically, it is preferred to meet the conditions (I) to (IV) listed below:

(I) The reaction is carried out by solution polymerization.

(II) The polymerization temperature is 0 to 200° C.

(III) The residence time is 5 to 120 minutes.

(IV) The pressure in the polymerization vessel is within a range of the atmospheric pressure to 100 kg/cm$^2$G.

More preferably, the copolymer can effectively be produced by using a solvent such as hexane and under conditions including a temperature at which the polymer is soluble, i.e. of from 30° C. or more and 160° C. or less, and a polymerization pressure of from 0 kg/cm$^2$G or more and 50 kg/cm$^2$G or less in a low-temperature low-pressure solution polymerization copolymer-production reaction apparatus.

The molar ratio of a unit derived from ethylene to a unit derived from α-olefin in the copolymer of the present invention is 95/5 to 20/80, preferably 90/10 to 40/60 and more preferably 85/15 to 50/50. When the molar ratio is too high, the product may be resinous and when it is too low, the strength may be insufficient.

The iodine value in the copolymer of the invention is 0 to 50 (g/100 g polymer), preferably 1 to 40 and more preferably 3 to 35. When the iodine value is too low, the vulcanization may become difficult and when it is too high,. the weatherability may be inferior.

The copolymer of the invention has an intrinsic viscosity [η] measured in xylene at 70° C. of 0.5 to 10 dl/g, preferably of 0.8 to 8 dl/g and more preferably of 1.0 to 5 dl/g. When the intrinsic viscosity is too low, the strength may be insufficient and when it is too high, the processability may be inferior.

The copolymer of the invention has a Q value (weight average molecular weight/number average molecular weight) measured by gel permeation chromatography (GPC) of 3.0 or more, preferably of 3.5 or more and more preferably of 4.0 or more. When the value is too low, the processability becomes bad.

The copolymer composition of the invention comprises the copolymer of the invention and all or part of a softening agent, a reinforcing agent and a vulcanizing agent.

The softening agent may be mixed to the copolymer during the production thereof or may be mixed mechanically with a Banbury mixer, rolls or the like. Specific examples of the softening agent include petroleum softening agents such as process oil, lubricant, paraffin, liquid paraffin, petroleum asphalt, vaseline and the like, coal tar softening agents such as coal tar, coal tar pitch and the like, fatty oil softening agents such as castor oil, linseed oil, colza oil, coconut oil and the like, waxes such as tall oil, factis, bees wax, carnauba wax, lanolin and the like, fatty acids and salts thereof such as ricinolic acid, palmitic acid, barium stearate, calcium stearate, zinc lauric acid and the like, synthetic high molecular substances such as petroleum resin, atactic polypropylene, coumarone-indene resin and the like.

The reinforcing agent includes, specifically, carbon black such as SRF, GPF, FEF, MAF, HAF, ISAF, SAF, FT, MT and the like, products-obtained by coating the carbon black with a silane coupling agent or the like, silica, activated calcium carbonate, pulverized talc, pulverized silicic acid and the like.

As the vulcanizing agent can be used sulfur, sulfur compounds, organic peroxides and the like. The morphology of sulfur is not particularly limited. For example, usable forms are powdery sulfur, precipitated sulfur, colloidal sulfur, surface-treated sulfur, insoluble sulfur and the like.

The composition of the invention may further contain ingredients other than the substance described above, for example, additives such as inorganic filler, stabilizing agent, processing aid, foaming agent, foaming aid, plasticizer, coloring agent, fire retardant and the like.

In addition, the composition of the invention may contain other rubber or resin, as required. The other rubber includes natural rubber (NR), isoprene rubber such as isoprene rubber (IR) and the like, conjugated diene rubber such as butadiene rubber (BR), styrene-butadiene rubber (SBR), acrylonitrile-butadiene rubber (NBR), chloroprene rubber (CR) and the like.

Furthermore, the composition of the invention may contain conventionally known ethylene-α-olefin copolymer rubber. For example, ethylene-propylene random copolymer (EPR), ethylene copolymer other than the above-described ethylene copolymer rubber, for example EPDM, can be used.

Examples of other resin include polyethylene resins such as high density polyethylene, medium density polyethylene, low density polyethylene, LLDPE (linear low density polyethylene) and the like, polypropylene resins, poly-4-methylpentene-1, polystyrene, polyesters, polyamides, polyphenylene ethers and the like.

The composition of the invention can be prepared from an ethylene-α-olef in nonconjugated polyene random copolymer and other ingredients described above according to the standard preparation process for rubber compositions. For, example, the preparation can be carried out by kneading the copolymer and other ingredients with an internal mixer such as Banbury mixer, kneader, inter-mix or the like at a temperature of 80 to 170° C. for 3 to 10 minutes. Then they are kneaded with a roll such as oven roll or a kneader at a temperature of 40 to 80° C. for 5 to 30 minutes with addition of vulcanizing agent, vulcanization accelerator, vulcanization aid or the like, if necessary, and extruded. In this manner, usually a composition (compounded rubber) in the form of ribbon or sheet can be obtained. When the kneading temperature with an internal mixer is low, a vulcanizing agent, a vulcanization accelerator, a foaming agent or the like can be mixed for simultaneous kneading.

The composition of the invention can be converted to a vulcanized copolymer composition by vulcanization. The preparation of the vulcanized copolymer composition can be carried out by preforming the unvulcanized composition into a desired form usually by various forming apparatuses such as extrusion-molding machine, calendering roll, press, injection-molding machine, transfer-molding machine or the like. Then the preform is vulcanized by heating it simultaneously with molding or after molding, and introducing it into a vulcanizing vessel, or by irradiating it with electronic rays.

When the vulcanization is effected by heating, it is preferred to heat at a temperature of 150 to 270° C. for 1 to 30 minutes using a heating vessel with a heating mean such as hot air, a glass beads fluidized bed, UHF (ultrahigh frequency), steam, LCM (hot-melt type salt bath).

When the vulcanization is effected by irradiating with electronic rays without using a vulcanizing agent, the preformed composition may be irradiated with electronic rays having an energy of 0.1 to 10 MeV, preferably of 0.3 to 2 MeV, so that the absorbed dose is 0.5 to 35 Mrad, preferably 0.5 to 10 Mrad.

The molding and vulcanization may be carried out with or without a die. In cases without a die, the composition is usually molded and vulcanized in a continuous manner. The vulcanized rubber molded and vulcanized as described above can be used as automobile industrial parts such as weather strip, door glass channel, window frame, radiator hose, brake parts, wiper blade, rubber vibration insulator and the like, industrial rubber products such as rubber roll, belt, packing, hose and the like, electrical insulating materials such as anode cap, grommet and the like, engineering and building materials such as building gasket, engineering sheet and the like, rubber coated fabric and others.

In addition, the vulcanized foam obtained by heating to foam the composition containing a foaming agent can be used as thermal insulating material, cushioning material, sealing material and the like.

As described above, the present invention could provide an ethylene-α-olefin-nonconjugated polyene random copolymer having a wide molecular weight distribution and superior in processability, a composition comprising said copolymer and a process for producing said copolymer.

EXAMPLES

The present invention will now be described in more detail with Examples and Comparative Examples, which should not be construed as a limitation upon the scope of the present invention.

I Method of Measurement

Properties of copolymers in Examples were measured by the following methods.
(1) Content of Propylene The content was measured by infrared absorption spectra using an infrared spectrophotometer (IR-810, manufactured by Nippon Bunko Kogyo) and standard sample of polypropylene, polyethylene and ethylene-propylene copolymer (50/50). The measurement was conducted with a sample film having a thickness of about 0.1 mm prepared by a hot-press machine. An average value was obtained from three measurements using an absorption peak at 1155 cm$^{-1}$ (methyl branch) as a marker according to literatures (Takayama, Usami et al., Characterization of polyethylene by infrared absorption spectra; McRae, M. A., Madams, W. F., et al., Die Makromolekularer Chemie, 177, 461 (1976).
(2) Iodine Value A copolymer was molded in the form of a film having a thickness of 0.5 mm by hot-press. The transmittance was measured at a peak (wave numbers of 1611 cm$^{-1}$ and 1688 cm$^{-1}$) derived from dicyclopentadiene and 5-ethylidene-2-norbornene. The molar content of double bond in the copolymer was calculated and converted into the iodine value.
(3) Molecular Weight and Molecular Weight Distribution These were measured with a gel permeation chromatograph (150C GPC apparatus manufacturedby Waters Co.). The elution temperature was 140° C. The column used was Shodex Packed Column A-80M, manufactured by Showa Denko K.K., and the standard substances for molecular weight were polystyrene (for example, those having molecular weights of 500–8,400,000, manufactured by Tosoh Co.). The obtained polystyrene-converted weight average molecular weight (Mw) and number average molecular weight (Mn) were used to calculate the ratio (Mw/Mn), which was taken as the molecular weight distribution (Q value). The sample for measurement was prepared by dissolving about 5 mg of the polymer in 5 ml of o-dichlorobenzene to form a solution having a concentration of about 1 mg/ml. A 400-μl aliquot of the obtained sample solution was injected and the eluting solvent at a flow rate of 1.0 ml/minute was determined by a refraction detector.

II Preparation of Catalyst

The preparation of catalyst components was carried out according to a method described in JP-A-9-87313.

III Examples and Comparative Examples

Comparative Example 1

Ethylene, propylene and 5-ethylidene-2-norbornene were continuously co-polymerized in a 100-liter polymerization vessel, made of stainless steel, equipped with stirring blades. Briefly, hexane was continuously fed as a solvent for polymerization to a lower site of the polymerization vessel at a rate of 83 liters/hour. On the other hand, the polymerization solution was continuously withdrawn from an upper site so that the polymerization solution in the polymerization vessel was 100 liters. Ethylene, propylene and 5-ethylidene-2-norbornene were continuously fed as monomers at the lower site of the polymerization vessel at rates of 3.00 kg/hour, 2.00 kg/hour and 0.75 kg/hour, respectively, into the polymerization vessel. Dimethylsilyl (tetramethylcyclopentadienyl) (3-tert-butyl-5-methyl-2-phenoxy) titanium dichloride, triphenylmethyl tetrakis(pentafluorophenyl)borate and triisobutyl aluminum were continuously fed as catalysts at the lower site of the polymerization vessel at rates of 0.030 g/hour, 0.923 g/hour and 1.769 g/hour, respectively, into the polymerization vessel. The molecular weight was adjusted with hydrogen. The co-polymerization reaction was effected at 100° C. by feeding low-pressure steam into a jacket attached outside the polymerization vessel. The polymerization solution withdrawn from the polymerization vessel was treated with a small amount of ethanol to quench the polymerization reaction, stripped of the monomers and washed with water. Then the solvent was removed by treating with steam in a large amount of water to separate a copolymer, which was dried at 80° C. for a day and night under reduced pressure. By the above procedure, ethylene/propylene/5-ethylidene-2-norbornene copolymer was produced at a rate of 3.5 kg/hour. Detailed results are shown in Table 1.

Example 1

Ethylene, propylene, 5-ethylidene-2-norbornene and dicyclopentadiene were continuously co-polymerized in a 100-liter polymerization vessel, made of stainless steel, equipped with stirring blades. Briefly, hexane was continuously fed as a solvent for polymerization to a lower site of the polymerization vessel at a rate of 83 liters/hour. On the other hand, the polymerization solution was continuously withdrawn from an upper site so that the polymerization solution in the polymerization vessel was 100 liters. Ethylene, propylene, 5-ethylidene-2-norbornene and dicyclopentadiene were continuously fed as monomers at the lower site of the polymerization vessel at rates of 3.00 kg/hour, 2.00 kg/hour, 0.60 kg/hour and 0.03 kg/hour, respectively, into the polymerization vessel. Dimethylsilyl (tetramethylcyclopentadienyl) (3-tert-butyl- 5-methyl-2-phenoxy) titanium dichloride, triphenylmethyl tetrakis (pentafluorophenyl)borate and triisobutyl aluminum were continuously fed as catalysts at the lower site of the polymerization vessel at rates of 0.045 g/hour, 1.378 g/hour and 2.640 g/hour, respectively, into the polymerization vessel. The molecular weight was adjusted with hydrogen. The co-polymerization reaction was effected at 89° C. by feeding low-pressure steam into a jacket attached outside the polymerization vessel. The polymerization solution withdrawn from the polymerization vessel was treated with a small amount of ethanol to quench the polymerization reaction, stripped of the monomers and washed with water. Then the solvent was removed by treating with steam in a large amount of water to separate a copolymer, which was dried at 80° C. for a day and night under reduced pressure. By the above procedure, ethylene/propylene/5-ethylidene-2-norbornene/dicyclopentadiene copolymer was produced at a rate of 3.6 kg/hour. Detailed results are shown in Table 1.

Example 2

The procedure in Example 1 was substantially repeated except that the feeding rates of 5-ethylidene-2-norbornene and dicyclopentadiene were 1.00 kg/hour and 0.30 kg/hour, respectively, and the rates of the catalysts dimethylsilyl (2,3,4,5-tetramethylcyclopentadienyl) (3-tert-butyl-5-methyl-2-phenoxy)titanium dichloride, triphenylmethyl tetrakis(pentafluorophenyl)borate and triisobutyl aluminum were 0.057 g/hour, 1.722 g/hour and 3.300 g/hour, respectively. At a polymerization temperature of 83° C., ethylene/propylene/5-ethylidene-2-norbornene/dicyclopentadiene copolymer was produced at a rate of 2.0 kg/hour. Detailed results are shown in Table 1.

TABLE 1

|  |  | Example 1 | Example 2 | Comparative example 1 |
| --- | --- | --- | --- | --- |
| Polymerization temperature | ° C. | 89 | 83 | 100 |
| Ethylene | Kg/h | 3.00 | 3.00 | 3.00 |
| Propylene | Kg/h | 2.00 | 2.00 | 2.00 |
| *1 ENB | Kg/h | 0.60 | 1.00 | 0.75 |
| *2 DCPD | Kg/h | 0.03 | 0.30 | — |
| *3 (a) | g/h | 2.640 | 3.300 | 1.769 |
| *4 (b) | g/h | 1.378 | 1.722 | 0.923 |
| *5 (c) | g/h | 0.045 | 0.057 | 0.030 |
| Yield | Kg/h | 3.6 | 2.0 | 3.5 |
| Content of ethylene | mol % | 66 | 68 | 66 |
| Content of propylene | mol % | 34 | 32 | 34 |
| Iodine value | g/100 g polymer | 22 | 26 | 22 |
| Intrinsic viscosity [η] | dl/g | 1.70 | 1.48 | 1.84 |
| GPC MW/Mn (Q value) | ° C. | 3.1 | 5.2 | 2.7 |

*1 ENB: 5-ethylidene-2-norbornene
*2 DCPD: dicyclopentadiene
*3 (a): triisobutyl aluminum
*4 (b): triphenylmethyl tetrakis(pentafluorophenyl)borate
*5 (c): dimethylsilyl (tetramethylcyclopentadienyl) (3-tert-butyl-5-methyl-2-phenoxy) titanium dichloride

What is claimed is:

1. An ethylene-α-olefin-nonconjugated polyene random copolymer obtained by polymerizing the following components (a), (b) and (c) in the presence of a catalyst comprising a transition metal complex having at least one cyclopentadienyl skeleton and satisfying the conditions (1), (2), (3) and (4):

(a) ethylene, (b) α-olefin having 3 to 20 carbon atoms, and (c) one or more nonconjugated polyene at least containing a nonconjugated polyene in which at least one or more hydrogen atoms are respectively bound to all of carbon atoms having a double bond;

(1) the molar ratio of a unit derived from ethylene to a unit derived from α-olefin in the copolymer is 95/5 to 20/80, (2) the iodine value is 0 to 50 (g/100 g polymer), (3) the intrinsic viscosity [η] measured in xylene at 70° C. is 0.5 to 10 dl/g, and (4) the Q value (weight average molecular weight/ number average molecular weight) measured by gel permeation chromatography (GPC) is 3.0 or more.

2. The copolymer according to claim 1, wherein the molar ratio of a unit derived from ethylene to a unit derived from α-olefin in the copolymer is 90/10 to 40/60.

3. The copolymer according to claim 1, wherein the molar ratio of a unit derived from ethylene to a unit derived from α-olefin in the copolymer is 85/15 to 50/50.

4. The copolymer according to claim 1, wherein the transition metal complex is a transition metal complex represented by the following chemical formula [I], [II] or [III]:

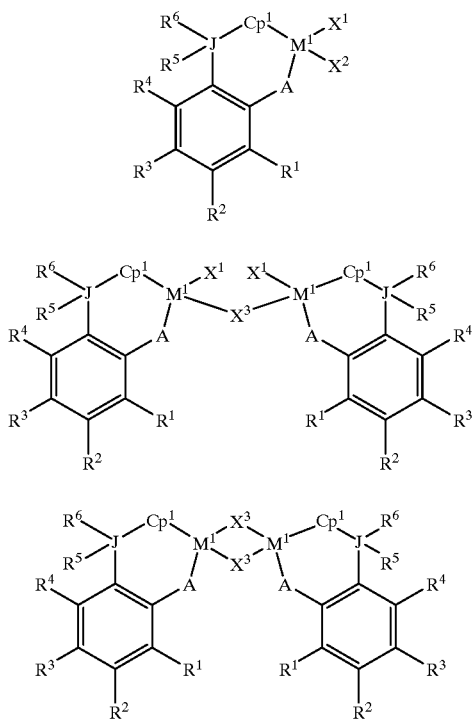

[I]

[II]

[III]

wherein $M^1$ represents a transition metal atom of group IV in the Periodic Table of the Elements; A represents an atom of group XVI in the Periodic Table of the Elements; J represents an atom of group XIV in the Periodic Table of the Elements; $Cp^1$ represents a group having a cyclopentadiene type anion skeleton; $X^1$, $X^2$, $R^1$, $R^2$, $R^3$, $R^4$, $R^5$ and $R^6$ independently represented a hydrogen atom, a halogen atom, an alkyl group, an aralkyl group, an aryl group, a substituted silyl group, an alkoxy group, an aralkyloxy group, an aryloxy group, or a disubstiuted amino group; and $R^1$, $R^2$, $R^3$, $R^4$, $R^5$ and $R^6$ may be combined optionally to form a ring, $X^3$ represents an atom of group XVI in the Periodic Table of Elements; each $M^1$, A, J, $Cp^1$, $X^1$, $X^2$, $X^3$, $R^1$, $R^2$, $R^3$, $R^4$, $R^5$ and $R^6$ may be the same or different.

5. The copolymer according to claim 1, wherein the copolymer is obtained by polymerizing the following components (a), (b) and (c) according to claim 1 in the presence of a catalyst comprising the transition metal complex (A) according to claim 4 and the following components (B), (C) or (B) and (C):

(B) one or more aluminum compounds selected from the group consisting of (B1), (B2) and (B3) described below:
(B1) an aluminum compound represented by the general formula: $E^1{}_a AlZ_{3-a}$,
(B2) a cyclic aluminoxane having a structure represented by the general formula: $\{-Al(E^2)-O-\}_b$, and
(B3) a linear aluminoxane having a structure represented by the general formula: $E^3\{-Al(E^3)-O-\}_c AlE^3{}_2$,
wherein $E^1$, $E^2$ and $E^3$ are respectively a hydrocarbon group, and all of $E^1$, $E^2$ and $E^3$ may be same or different; Z is a hydrogen atom or a halogen atom and all of Z may be same or different; "a" is a number satisfying $0<a\leq 3$, "b" is an integer of 2 or more and "c" is an integer of 1 or more;
(C) a boron compound represented by anyone of (C1), (C2) and (C3):
(C1) a boron compound represented by the general formula: $BQ^1Q^2Q^3$,
(C2) a boron compound represented by the general formula: $G^+(BQ^1Q^2Q^3Q^4)^-$, and
(C3) a boron compound represented by the general formula: $(L-H)^+(BQ^1Q^2Q^3Q^4)^-$,
wherein B is a boron atom in the trivalent valence state, $Q^1$, $Q^2$, $Q^3$ and $Q^4$ are a halogen atom, a hydrocarbon group, a halogenated hydrocarbon group, a substituted silyl group, an alkoxy group or a di-substituted amino group, which may be same or different, $G^+$ is an inorganic or organic cation, L is a neutral Lewis base and $(L-H)^+$ is a Brønsted acid.

6. The copolymer according to claim 1, wherein the Q value is 3.5 or more.

7. The copolymer according to claim 1, wherein the Q value is 4.0 or more.

8. The copolymer according to claim 1, wherein (b) is at least one of propylene or 1-butene.

9. The copolymer according to claim 1, wherein (b) is propylene.

10. The copolymer according to claim 1, wherein non-conjugated polyene (c) containing at least one or more hydrogen atoms respectively bound to all of carbon atoms having a double bond is a norbornadiene derivative, dicyclopentadiene derivative, or a norbornadiene derivative having vinyl structure.

11. A copolymer composition comprising:
a copolymer according to claim 1; and
at least one of a softening agent, a reinforcing agent or a vulcanizing agent.

12. A vulcanized copolymer composition formed by vulcanizing a copolymer composition according to claim 11.

* * * * *